United States Patent
Oka et al.

[11] Patent Number: 5,886,417
[45] Date of Patent: Mar. 23, 1999

[54] ELECTRICAL POWER GENERATING INSTALLATION AND METHOD OF OPERATING SAME

[75] Inventors: Kiyoshi Oka, Hitachi; Osamu Nagura, Hitachinaka, both of Japan

[73] Assignee: Hitachi, Ltd, Tokyo, Japan

[21] Appl. No.: 848,720

[22] Filed: May 19, 1997

Related U.S. Application Data

[63] Continuation of Ser. No. 530,677, Sep. 19, 1995, abandoned.

[30] Foreign Application Priority Data

Sep. 19, 1994 [JP] Japan .................................. 6-222951

[51] Int. Cl.⁶ .................................................. F01D 15/10
[52] U.S. Cl. .............................. 290/52; 318/257; 307/31
[58] Field of Search ........................ 290/43, 52; 307/31, 307/19; 318/257, 798

[56] References Cited

U.S. PATENT DOCUMENTS

| | | | |
|---|---|---|---|
| 3,343,000 | 9/1967 | Bobo | 307/57 |
| 4,743,827 | 5/1988 | Shiozaki et al. | 318/798 |
| 4,754,156 | 6/1988 | Shiozaki et al. | 290/52 |
| 4,816,696 | 3/1989 | Sakayori et al. | 290/52 |
| 4,856,965 | 8/1989 | Katsuie et al. | 417/19 |
| 4,949,021 | 8/1990 | Rozman et al. | 318/254 |
| 4,952,852 | 8/1990 | Bando et al. | 318/140 |
| 4,967,096 | 10/1990 | Diemer et al. | 307/19 |
| 5,373,194 | 12/1994 | Nakamura | 307/31 |
| 5,561,358 | 10/1996 | Kuwabara et al. | 318/799 |

FOREIGN PATENT DOCUMENTS 58-54837  3/1983  Japan .

*Primary Examiner*—Thomas M. Dougherty
*Assistant Examiner*—Nicholas Ponomarenko
*Attorney, Agent, or Firm*—Evenson, McKeown, Edwards & Lenahan P.L.L.C.

[57] ABSTRACT

An electric power generating installation has a plurality of generator/motor units, each of which has a motor for converting kinetic energy into turning torque, a generator connected mechanically to the motor and connected electrically to an electric power system for converting turning torque into electric energy. A control system is provided for controlling the motor and the generator in such a way that they can be operated stably and continuously. The control system controls the different generator/motor units in different control modes so as to minimize cross current and resonance or beat phenomena.

22 Claims, 10 Drawing Sheets

ELECTRICAL POWER GENERATING INSTALLATION AND METHOD OF OPERATING SAME

This application is a continuation of application Ser. No. 08/530,677, filed on Sep. 19, 1995 now abandoned.

BACKGROUND AND SUMMARY OF THE INVENTION

The present invention relates to control equipment and methods for a power generation unit which supplies effective power to a power system connected electrically to the power generation unit for a load unit to which the effective power is supplied.

Generally, it is well known that a circulating current flows between generators when the reactive power in a power system is varied by external disturbances in a system with a plurality of synchronous generators with the same specifications and characteristics connected to the same power system and operated in parallel. Hereinafter, the circulating current will be referred to as a cross current.

An example of a cross-current suppressing system is disclosed in the Japanese Patent Application Laid-open No. 58-54837 (1983).

While it is possible to recover the variation of the reactive power by using the method mentioned above, the recovery method may take several seconds, because it adopts a two-step loop control.

It is desired to instantaneously recover the electric power system when the disturbance of the power system occurs, since otherwise social activities dependent on electrical power are interrupted. A variable speed pumping-up power generation system was developed in order to comply with such a high speed requirement. This variable speed system adopted a secondary excitation induction dynamo electric machine. It becomes possible to recover the effective power of the disturbed power system within some milli-seconds by using the variable speed pumping-up power generation system. When the cross-current flowed between the variable speed generator/motors by the disturbances, etc. in the variable speed pumping-up power generation system under the parallel operation, it is very difficult to eliminate the cross-current in a short time utilizing the prior art techniques mentioned above. Accordingly, the advantages of high speed response of the variable speed pumping-up power generation system are not practically attainable in such systems having a plurality of such variable speed generator/motor units.

Further, when a plurality of variable speed generator/motor units are operated utilizing a same operation control method, resonance or "beat" may occur between the variable speed generator/motors. Accordingly, it is undesirable to operate the plurality of variable speed generator/motor units under the same operation condition.

An object of the present invention is to provide an improved control system for electrical power generating installations having a plurality of variable speed generator/motor units operating in parallel, in which the resonance or the beat does not occur.

In order to achieve this object, a variable speed pumping-up power generation system including at least two variable speed generator/motor units operated in parallel, is divided into at least two groups. Each of the groups is controlled by using physical quantities representing operating conditions of respective variable speed generator/motor units concerned which are different from each other, to which a feedback control is performed, or control quantities different from each other are used in the control equipment of each group, or both of them are combined.

According to the present invention, each group of the variable speed pumping-up power generation system is controlled in a different way or control mode. Therefore, the resonance or the beat does not occur between the groups each including the variable speed generator/motor unit. Further, the cross-current produced by an external disturbance can be quickly eliminated. As a result, the instantaneous recovery of the variable speed pumping-up power generation system becomes possible.

As described above, according to the present invention, the stable operation condition of the variable speed pumping-up power generation system can be maintained, thus the stability of the power system can be improved.

Other objects, advantages and novel features of the present invention will become apparent from the following detailed description of the invention when considered in conjunction with the accompanying drawings.

DETAILED DESCRIPTION OF THE DRAWINGS

Figure 1:
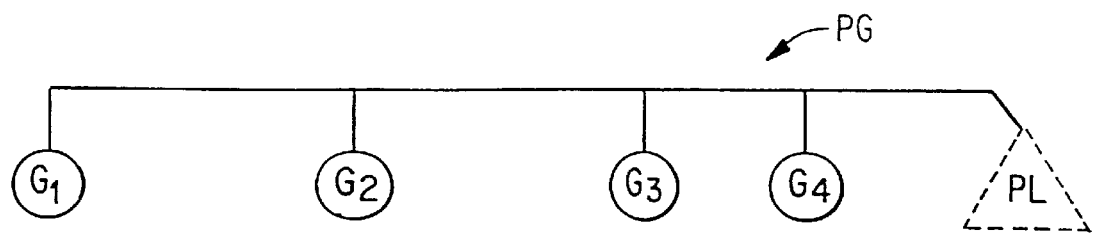
FIG. 1 is a schematic depiction of an electrical power grid of the type contemplated by the present invention.

FIG. 1 schematically depicts a power grid system PG of the type contemplated by the present invention. A plurality of electrical power generating units $G_1$, $G_2$, $G_3$, $G_4$ are connected in the power grid PG. By way of example, unit $G_2$ could be a nuclear power plant which supplies 30% of peak power loads, unit $G_3$ could be a thermal power plant which supplies 55% of peak power loads, and unit $G_4$ could be a water turbine power plant which supplies 10% of peak power loads. The unit $G_1$ could be a generator/motor power plant which supplies 5% of peak power loads and functions to precisely control power supply (generating mode) and power loading (pumping mode) of the power grid.

Electrical power loads PL are imposed on the power grid PG in the form of electrically driven equipment in factories, household appliances, and the like. The power loads fluctuate throughout the day, with usually very low loads at night. In practice, generating units $G_3$ and $G_4$ may be shut down during low loads, while unit $G_2$ will run continuously. Unit $G_1$ will continue to operate and serve to precisely and rapidly control power grid power supply fluctuations.

Figure 2:
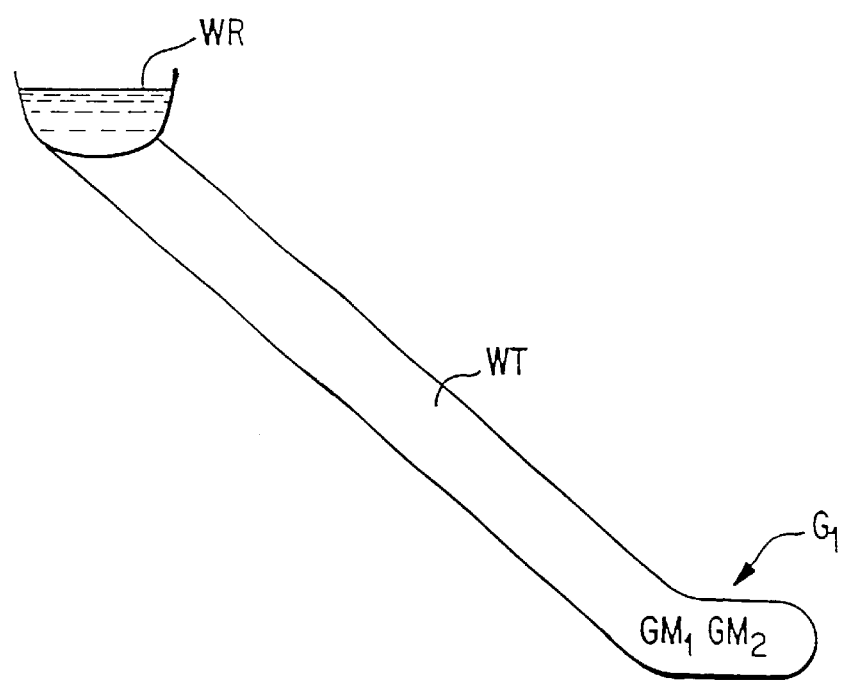
FIG. 2 is a schematic depiction of a power generation unit which includes a plurality of variable speed generator/motor units of the type controlled in accordance with the present invention.

Referring to FIG. 2, unit $G_1$ is configured as a system with a water reservoir WR, a water tunnel WT connected to the reservoir WR, and two generator/motor units $GM_1$ and $GM_2$ driven by the water in water tunnel WT. The units $GM_1$ and $GM_2$ include selectively operable pumps for pumping water back to the reservoir WR when excess power is available in the power grid PG. In this way, these generator/motor units $GM_1$ and $GM_2$ serve to balance the fluctuating power needs. The present invention is concerned with an improved system of units like $GM_1$ and $GM_2$ and their control.

The example of the above-mentioned Japanese Patent Application No. 58-54837 (1983) will be explained with reference to FIG. 3. In an electric power system 7 in which a power source 2 is connected to a demand 3, two generator/motor units 18a and 18b are connected to a parallel point 6 and operated in parallel with each other. The parallel point 6 is connected to a parallel point 5 in the electric power system 7, and two hydraulic pump-turbines 12a and 12b are connected directly to the generator/motor units 18a and 18b, respectively.

The reactive power of the system in which each generator is connected is detected by a reactive power detector 13. The output signal of the reactive power detected in each system is inputted to a reactive power reference value regulator 14, in which an average value of the reactive powers is calculated by using its output signals. The output signal of the reference value regulator 14 is inputted to a reactive power regulator (AQR) 15 as a reference signal. In the reactive power regulator 15, the reference signal is compared with the reactive power output signal of each system. The output signal of the reactive power regulator 15 is outputted to a voltage regulator (AVR) 17a, 17b which compares the output signal of the reactive power regulator 15 with an output voltage of the generator detected by a voltage of the generator detected by a voltage detector 16 controls the voltage of the electric generator. When the reactive power of each system was varied by external disturbances, etc., the cross current may flow between the system including the first generator/motor unit 18a and the system including the second generator/motor unit 18b. However, the reactive power reference value regulator 14 regulates so as to match the reactive power to the reference value calculated. The output voltages of the electric generator/motor units 18a and 18b are regulated by the voltage regulators 17a and 17b, respectively, in accordance with the output of the reference value regulator 14, thereby the difference between the reactive powers of the systems can be eliminated, and thus the cross current can be also reduced.

Figure 4:
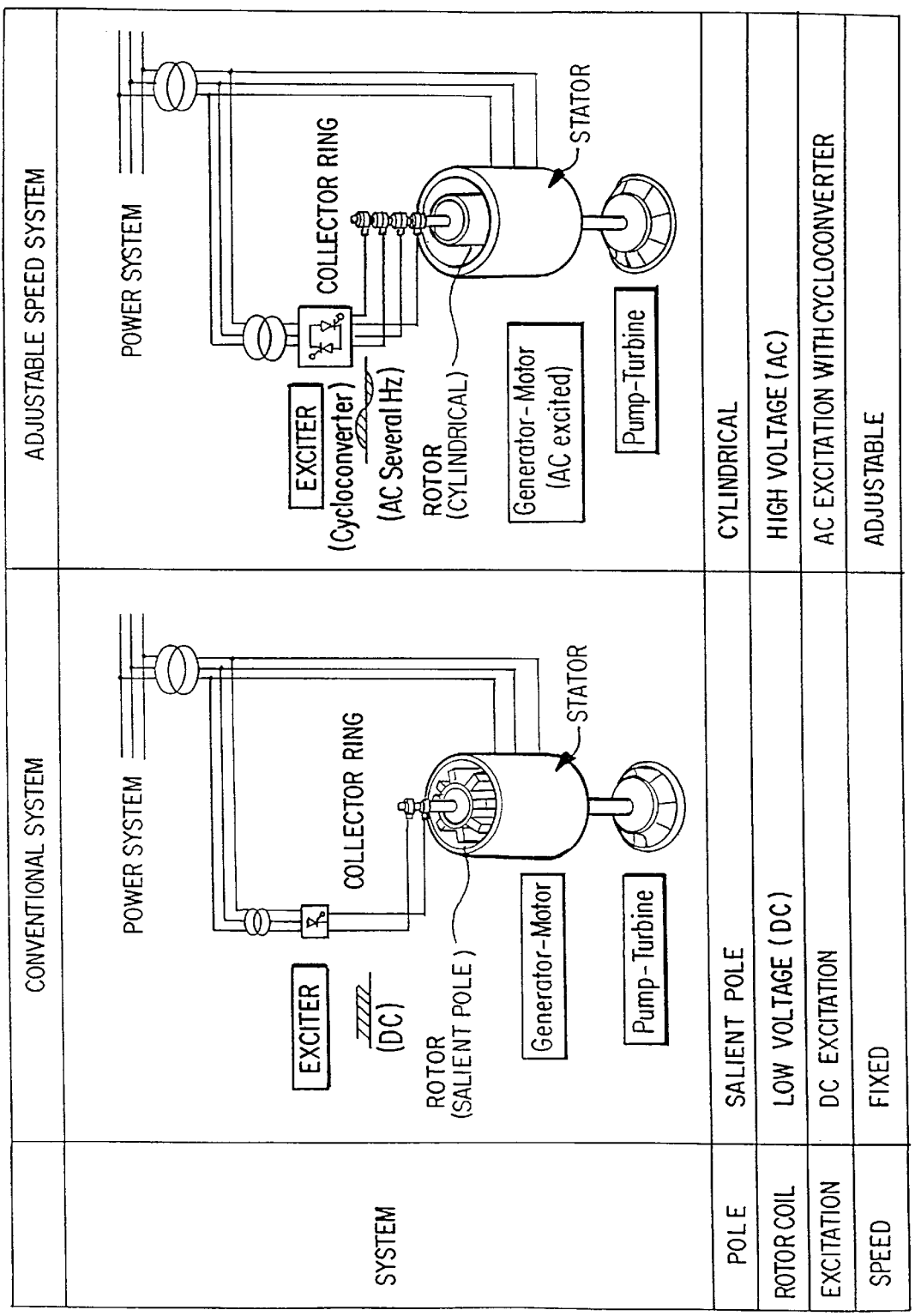
FIG. 4 is a schematic side by side comparison of a conventional generator/motor unit system and a variable speed generator/motor unit system of the type contemplated for preferred embodiments of the present invention.
Figure 5:
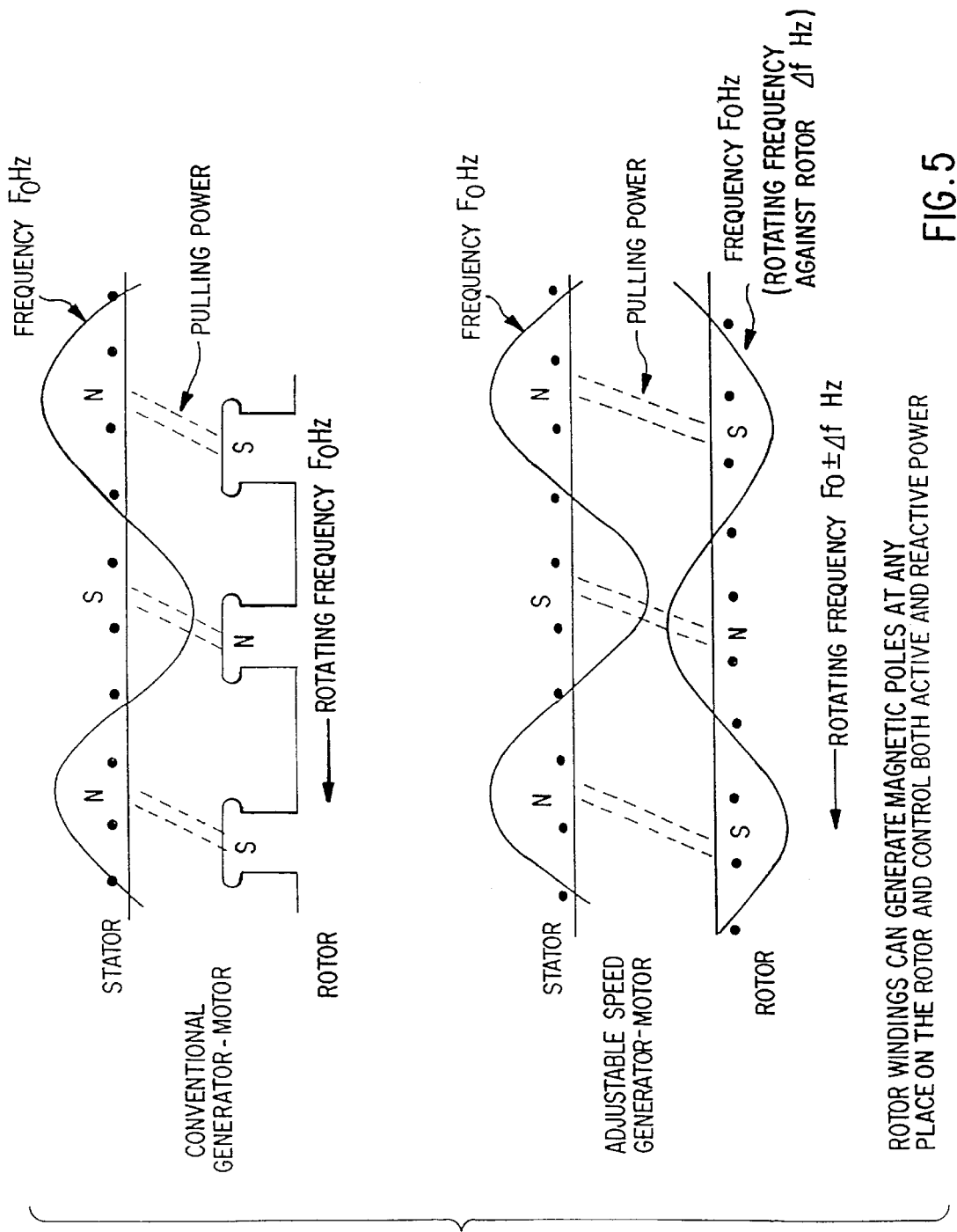
FIG. 5 is a schematic comparison of the stator/rotor/magnetic patterns for a conventional generator/motor unit and a variable speed generator/motor unit of the type contemplated for use with preferred embodiments of the present invention.
Figure 6:
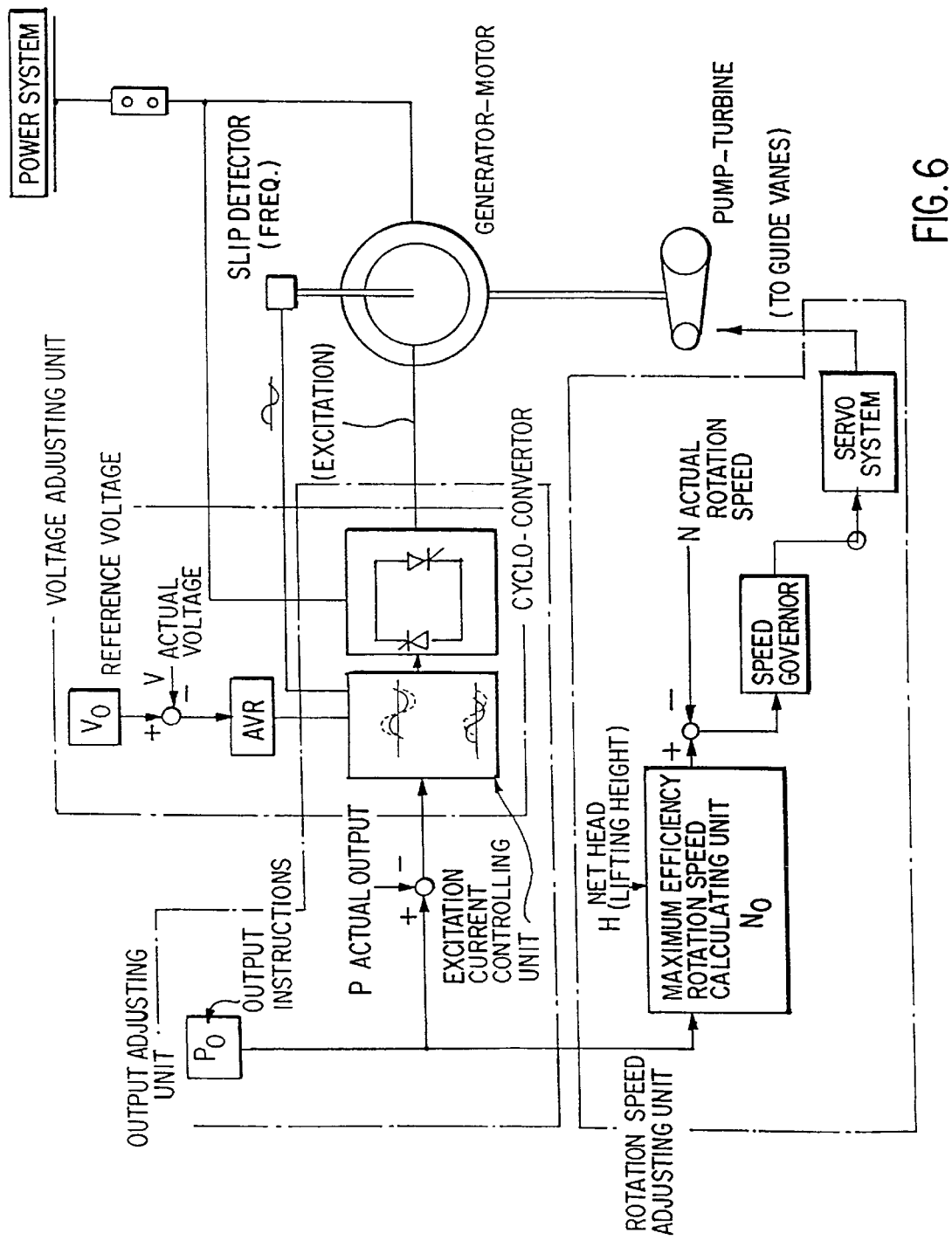
FIG. 6 is a schematic diagram showing operation and control of a variable speed generator/motor unit of the type contemplated for use with preferred embodiments of the present invention.

FIGS. 4–6 schematically depict and explain features and advantages of variable speed generator/motor units of the type contemplated for use with the present invention. By utilizing alternating current (AC) excitation with a cycloconverter, the speed of the unit can be continuously adjusted with rapid, precise control response characteristics. The following description of preferred embodiments of control installations according to the present invention are based on utilizing variable speed generator/motor units of this type.

Figure 3:
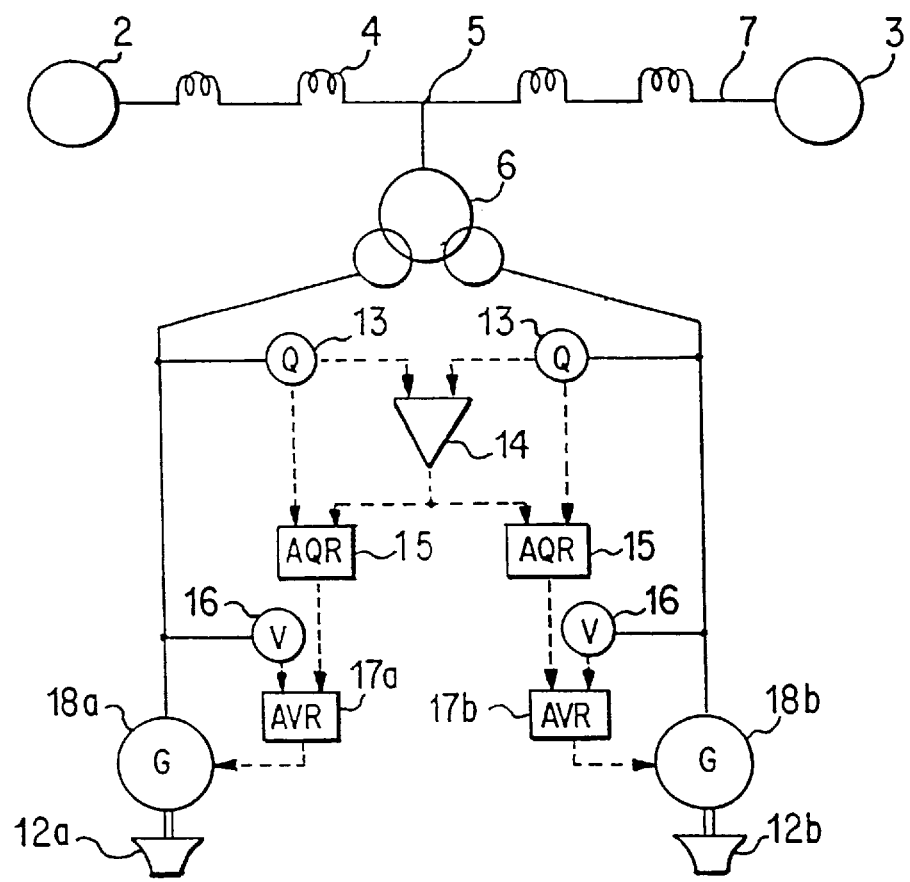
FIG. 3 is a schematic diagram depicting a prior art control installation.
Figure 7:
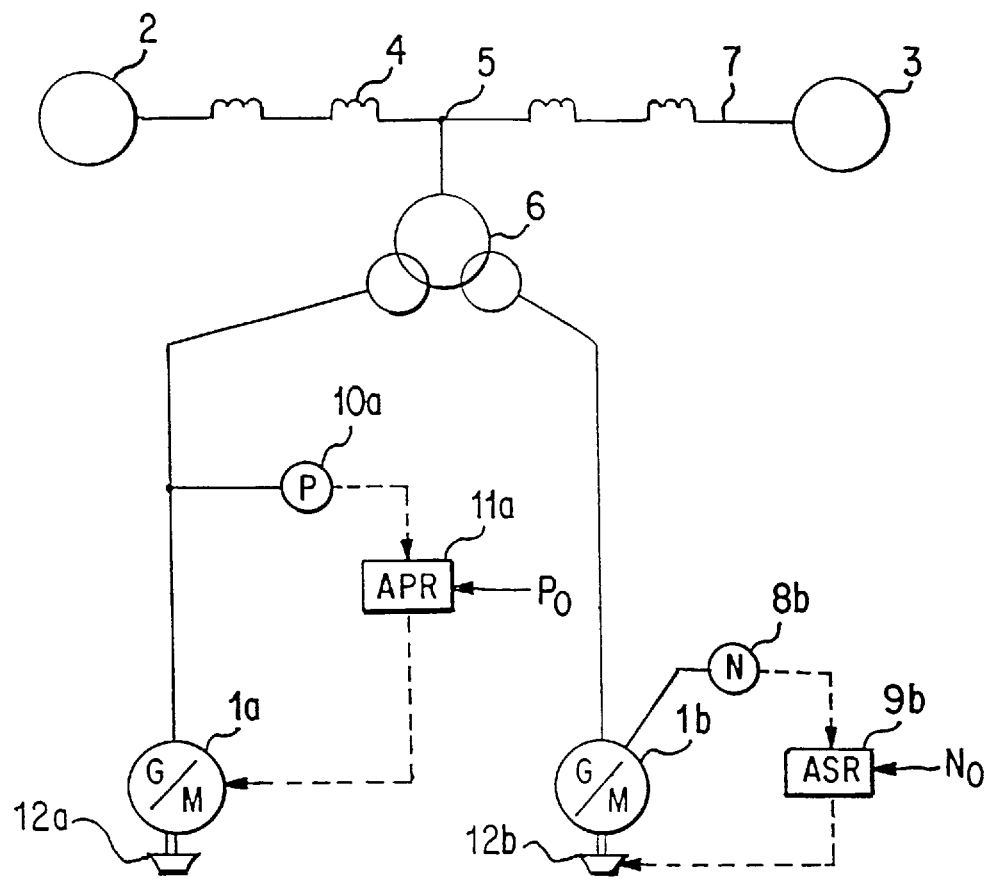
FIG. 7 is a schematic diagram depicting a control installation constructed according to a first preferred embodiment of the present invention.

The generator/motor units 18a and 18b shown in FIG. 3 are replaced by variable speed generator/motor units 1a and 1b, respectively, in FIG. 7. An effective power regulator 11a compares an effective power reference value Po with the output signal from an effective power detector 10a, and controls an effective power output of the variable speed generator/motor unit 1a. An automatic rotation speed regulator (ASR) 9b compares a predetermined rotation speed reference value No with the output signal from a rotation speed detector 8b for the generator/motor unit 1b, and controls the rotation speed of hydraulic pump turbine 12b. Thereby, each of the variable speed pumping-up power generation systems can be controlled in a different way, and thus the cross current can be instantaneously eliminated, which flows between the variable speed generator/motor units.

Figure 8:
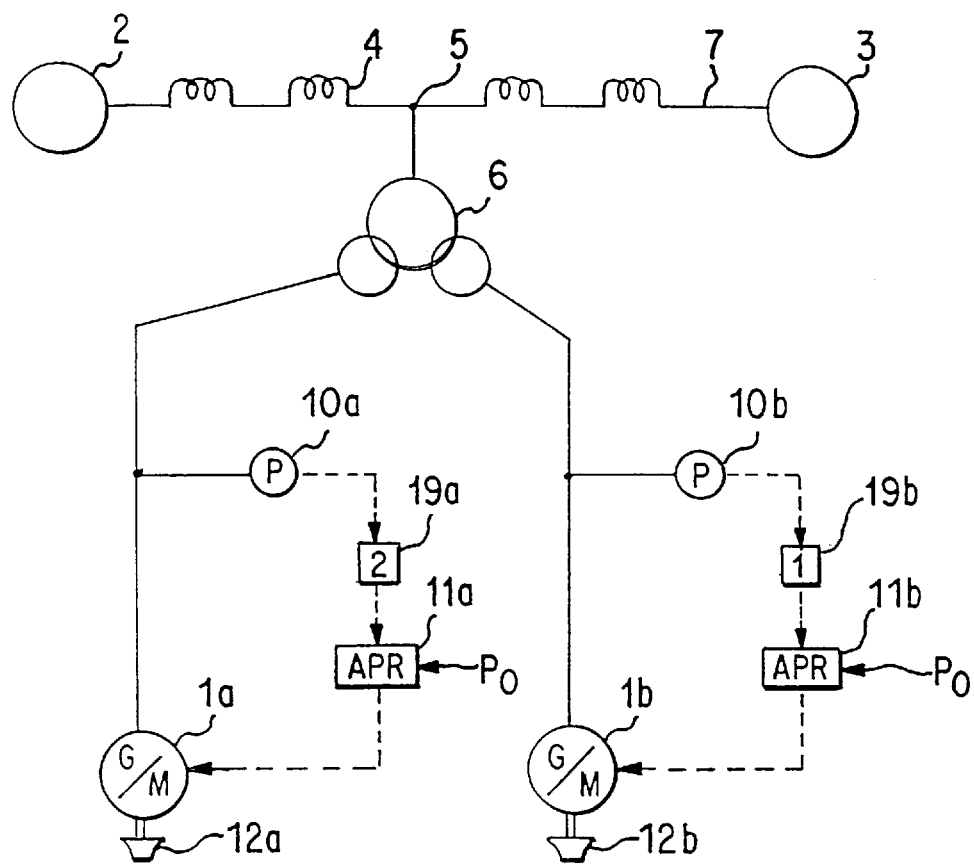
FIG. 8 shows another embodiment of the present invention in which the same physical quantities are detected and the control quantities in respective control equipments are different from each other.

FIG. 8 shows another embodiment of the present invention. In the groups including variable speed generator/motor units 1a and 1b, the effective power detected by the effective powers detectors 10a and 10b are transferred through multipliers 19a and 19b to automatic effective power regulators (APR) 11a and 11b having a predetermined reference value Po, respectively. The automatic effective power regulators 11a and 11b compare the reference value Po with the output value of the multipliers 19a and 19b, respectively, and control the effective power output of the variable speed generator/motor units 1a and 1b, respectively.

By presetting different numerical values to the multipliers 19a an 19b, it is possible to change the control method in each of the groups including the variable speed generator/motor units 1a and 1b, respectively. Therefore, a similar effect as with the embodiment of FIG. 7 can be obtained insofar as avoiding resonance and cross current.

Figure 9:
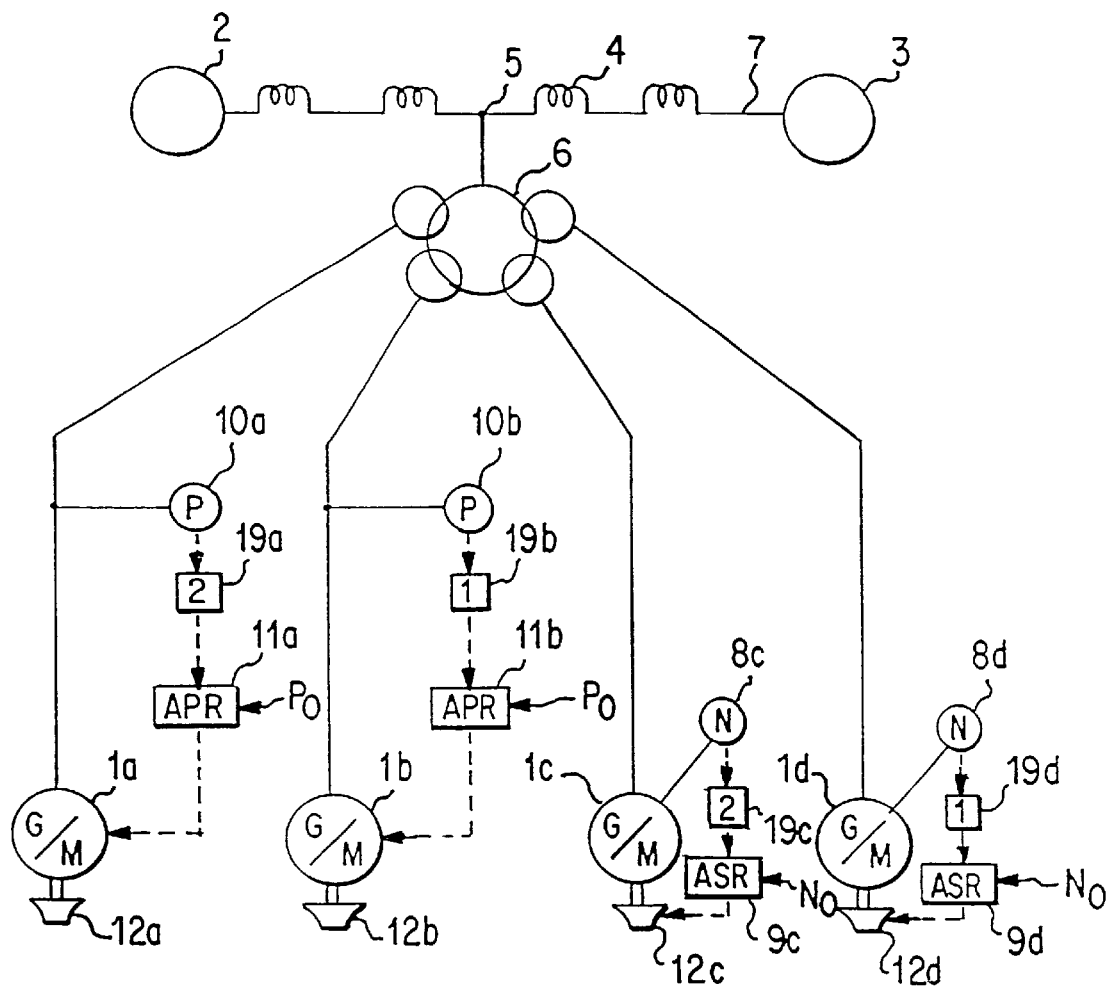
FIG. 9 shows still another embodiment of the present invention in which four groups of variable speed generator/motor units are operated in parallel.

FIG. 9 shows still another embodiment of the present invention, in which four variable speed generator/motor units 1a to 1d are connected with one another at a parallel point 6, and operated in parallel. The parallel point 6 is connected to a parallel point 5 in a power system 7. The hydraulic pump turbines 12a to 12d are connected directly to the variable speed generator/motor units 1a to 1d.

In the groups including variable speed generator motor units 1a and 1b respectively, the effective powers detected by the effective power detectors 10a and 10b are transferred through multipliers 19a and 19b to automatic effective power regulators 11a and 11b, respectively. The automatic effective power regulators 11a and 11b compare a predetermined reference value Po of effective power with the output values of the multipliers 19a and 19b, respectively, and control the effective power output of the variable speed generator/motor units 1a and 1b, respectively. Different numerical values are preset to the multipliers 19a and 19b in the manner as described above for FIG. 8.

In the groups including variable speed generator/motor units 1c and 1d, respectively, the rotation speeds detected by the rotation speed detectors 8c and 8d of the generator/motor units are transferred through multipliers 19c and 19d to automatic rotation speed regulators 9c and 9d, respectively. The automatic rotation speed regulators 9c and 9d compare a predetermined reference value No of rotation speed with the output values of the multipliers 19c and 19d, respectively, and control the rotation speed of the hydraulic pump-turbines 12c and 12d, respectively. The different numerical values are preset to the multipliers 19c and 19d so that it is possible to change the control method in each of the four groups of the variable speed pumping-up power generation system.

Figure 10:
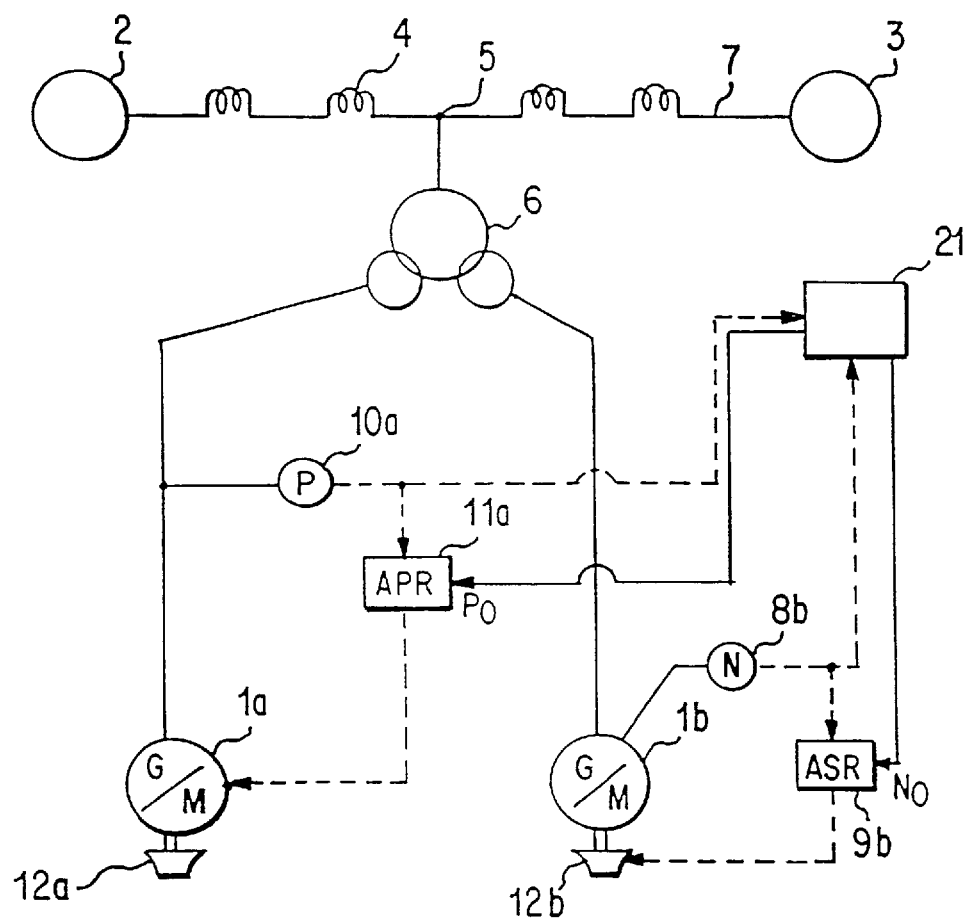
FIG. 10 shows a further embodiment of the present invention in which predetermined reference values are supplied from a feed command center to respective control equipment.

Referring now to FIG. 10 which shows a further embodiment of the present invention, in which there is provided a feed command center 21 in addition to the circuit of FIG. 7. The feed command center 21 is provided in the power plant. The feed command center 21 compares the detected values derived from the effective power detector 10a and the rotation speed detector 8b of the respective generator/motor units 1a and 1b, and supplies an effective power reference value Po and a rotation speed reference value No to the automatic effective power regulator 11a and the automatic rotation speed regulator 9b. Thereby the cross current between two groups can be instantaneously eliminated.

The physical quantities representing operating conditions of respective variable speed generator/motor units concerned controlled by the rotation speed regulators 9b, 9c and 9d, the effective power regulators 11a and 11b, the reactive power reference value regulator 14, the voltage regulator 17a and 17b, etc., are correlated. For example, the correlation between the output of the generator, the output of the motor, and the rotation speed is closer because these are correlated by an equation of motion. Therefore, if two conditions are determined, the remaining condition is unconditionally determined. On the other hand, the correlation between the reactive power and the voltage is relatively weak.

An object of the present invention is to provide a control equipment in which the physical quantities having the correlation as mentioned above are controlled in cooperation without contradiction.

Figure 11:
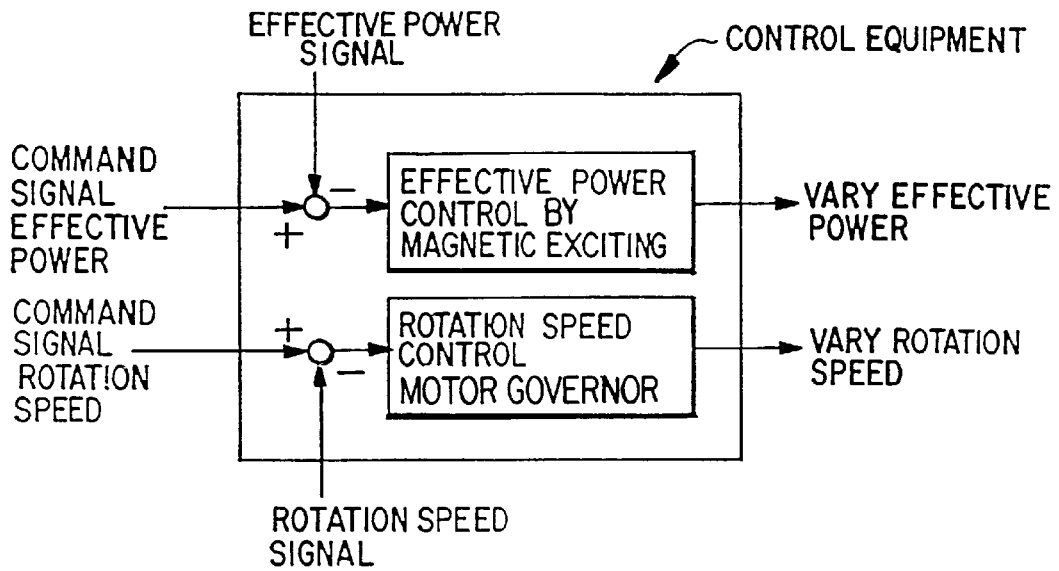
FIG. 11 is an illustration showing a concept of the present invention.
Figure 12:
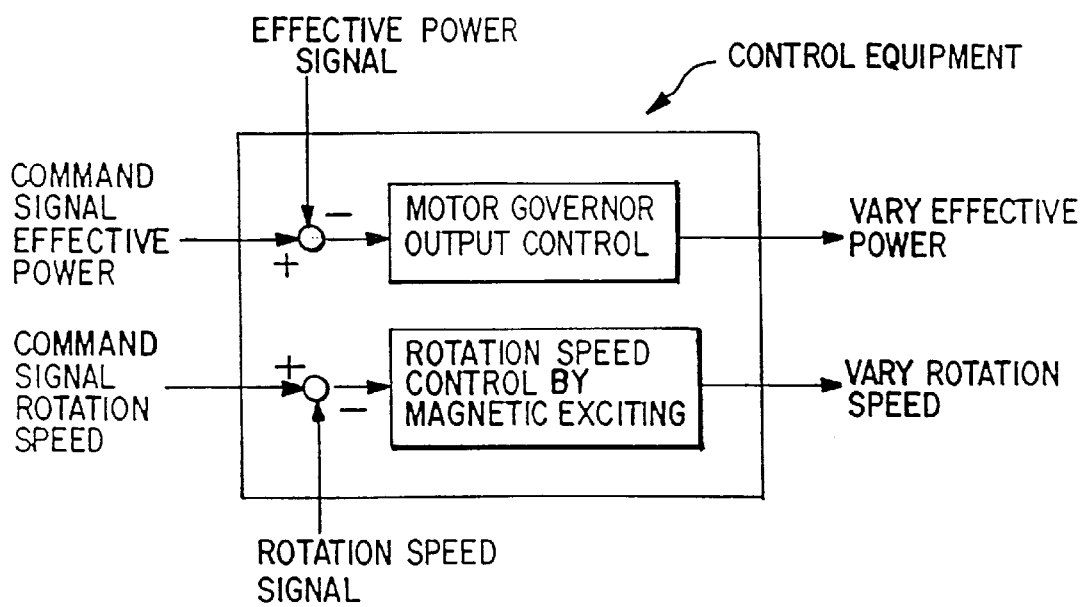
FIG. 12 is another illustration showing a concept of the present invention.

FIGS. 11 and 12 are illustrations of concepts of the present invention. As seen from these figures, even if the input and the output of two control equipments are the same, it is possible to obtain the desired effect when different control modes are performed in the two control equipments. For example, with regard to the control of effective power, the magnetic exciting control is used in one example, but the motor governor control is used in the other example. The same is true with regard to the rotation speed. Further, even if the control method in the two control equipments is the same, it is possible to obtain the desired effect when the different time constant and the different correction gain in the feedback control is used.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. An electrical power generating installation comprising:
a first generator/motor unit supplied with kinetic energy from a kinetic energy source and serving to supply electric power to a power grid,
a second generator/motor unit supplied with kinetic energy from a kinetic energy source and serving to supply electric power to the power grid in parallel with the supply from the first generator/motor unit,
and a control installation for controlling the respective first and second generator/motor units in respective different control modes to thereby minimize cross current between the first and second generator/motor units while providing stable and continuous control of the same in response to variations in electric power load at the power grid.

2. An electrical power generating installation according to claim 1,
wherein said first and second generator/motor units are variable rotational speed units which are similar to one another.

3. An electrical power generating installation according to claim 2, wherein said kinetic energy source is a water tunnel, and wherein said first and second generator/motor units include turbine wheels powered by water flow in the water tunnel.

4. An electrical power generating installation according to claim 3, wherein said generator/motor units are controllable to operate respective water pumps for pumping water in the water tunnel to an upstream reservoir when excess power is available at the power grid.

5. An electrical power generating installation according to claim 1, wherein said control installation includes means for controlling the first generator/motor unit in a power control mode as a function of effective power output detected at the first generator/motor unit and means for controlling the second generator/motor unit in a rotational speed control mode as a function of the rotational speed of the second generator/motor unit.

6. An electrical power generating installation according to claim 3, wherein said control installation includes means for controlling the first generator/motor unit in a power control mode as a function of effective power output detected at the first generator/motor unit and means for controlling the second generator/motor unit in a rotational speed control mode as a function of the rotational speed of the second generator/motor unit.

7. An electrical power generating installation according to claim 6, wherein said generator/motor units are controllable to operate respective water pumps for pumping water in the water tunnel to an upstream reservoir when excess power is available at the power grid.

8. An electrical power generating installation according to claim 3, wherein said control installation includes means for controlling both the first and second generator/motor units in a power control mode as a function of effective power output detected at the respective first and second generator/motor units,
and wherein said control installation includes respective different mathematical conversion factors for converting detected physical operating conditions used in control of the respective first and second generator/motor units.

9. An electrical power generating installation according to claim 3, wherein said control installation includes a feed command center for collecting operating data from both the first and second generator/motor units and for separately controlling said first and second generator/motor units as a function of the respective operating data.

10. An electrical power generating installation according to claim 5, wherein said control installation includes a feed command center for collecting operating data from both the first and second generator/motor units and for separately controlling said first and second generator/motor units as a function of the respective operating data.

11. An electrical power generating installation according to claim 6, wherein said control installation includes a feed command center for collecting operating data from both the first and second generator/motor units and for separately controlling said first and second generator/motor units as a function of the respective operating data.

12. An electrical power generating installation according to claim 1, comprising a third motor/generator unit supplied with kinetic energy from a kinetic energy source and serving to supply electric power to the power grid in parallel with the supply from the first and second generator/motor units, and wherein said control installation includes means for controlling the third generator/motor unit in a control mode which differs from at least one of the control modes for the first and second generator/motor units.

13. An electrical power generating installation according to claim 2, comprising further similar generator/motor units, and wherein said control installation includes means for controlling the further generator/motor units in respective different operating modes than each other and the first and second generator/motor units.

14. A method of controlling generator/motor units in an electrical power generating installation of the type having:

a first generator/motor unit supplied with kinetic energy from a kinetic energy source and serving to supply electric power to a power grid, a second generator/motor unit supplied with kinetic energy from a kinetic energy source and serving to supply electric power to the power grid in parallel with the supply from the first generator/motor unit, said method comprising:

controlling the respective first and second generator/motor units in respective different control modes to thereby minimize cross current between the first and second generator/motor units while providing stable and continuous control of the same in response to variations in electric power load at the power grid.

15. A method according to claim 14, wherein said first and second generator/motor units are variable rotational speed units which are similar to one another.

16. A method according to claim 15, wherein said kinetic energy source is a water tunnel, and wherein said first and second generator/motor units include turbine wheels powered by water flow in the water tunnel.

17. A method according to claim 16, wherein said generator/motor units are controllable to operate respective water pumps for pumping water in the water tunnel to an upstream reservoir when excess power is available at the power grid.

18. A method according to claim 14, comprising controlling the first generator/motor unit in a power control mode as a function of effective power output detected at the first generator/motor unit and controlling the second generator/motor unit in a rotational speed control mode as a function of the rotational speed of the second generator/motor unit.

19. A method according to claim 14, comprising controlling both the first and second generator/motor units in a power control mode as a function of effective power output detected at the respective first and second generator/motor units, and wherein said controlling includes use of respective different mathematical conversion factors for converting detected physical operating conditions used in control of the respective first and second generator/motor units.

20. A method according to claim 18, wherein said first and second generator/motor units are variable rotational speed units which are similar to one another.

21. A variable speed pumping-up power generation system comprising:

a first variable speed generator/motor mechanically coupled to a first hydraulic pump-turbine;

a second variable speed generator/motor mechanically coupled to a second hydraulic pump-turbine, said second variable speed generator/motor being adapted to be operated in parallel with said first variable speed generator/motor;

a first feed-back control unit which performs an operation control of said first variable speed generator/motor based on a first quantity representing a current operating condition of said first variable speed generator/motor; and a second feed-back control unit which performs an operation control of said second variable speed generator/motor based on a second quantity different from the first quantity representing a current operating condition of said second variable speed generator/motor.

22. A variable speed pumping-up power generation system comprising:

a first variable speed generator/motor mechanically coupled to a first hydraulic pump-turbine;

a second variable speed generator/motor mechanically coupled to a second hydraulic pump-turbine, said second variable speed generator/motor being adapted to be operated in parallel with said first variable speed generator/motor;

a first feed-back control unit which performs an operation control of said first variable speed generator/motor based on a first control mode; and a second feed-back control unit which performs an operation control of said second variable speed generator/motor based on a second control mode different from the first control mode.

* * * * *